June 28, 1938. E. H. LAND 2,122,178
DIFFUSING LIGHT POLARIZER
Filed Sept. 30, 1936
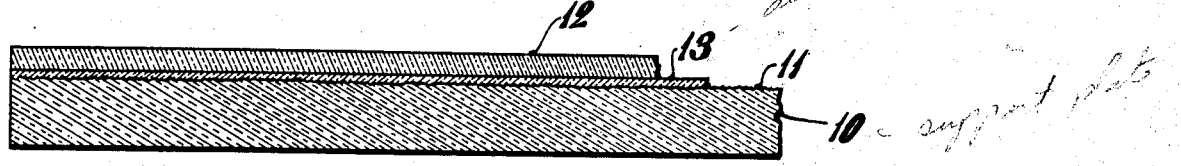
Edwin H. Land
INVENTOR
BY Brown & Jones
ATTORNEYS Patented June 28, 1938

2,122,178

UNITED STATES PATENT OFFICE 2,122,178

DIFFUSING LIGHT POLARIZER

Edwin H. Land, Wellesley Farms, Mass., assignor to Sheet Polarizer Company, Inc., Union City, N. J., a corporation of New Jersey Application September 30, 1936, Serial No. 103,323

9 Claims.  (Cl. 88—1)

This invention relates to a new and improved light-polarizer, and has for its object the provision of means for polarizing and diffusing a transmitted beam of light.

Other objects of the invention are to provide a laminated light-polarizing structure comprising a sheet of light-polarizing material and a light-transmitting supporting element affixed thereto; to provide such a structure wherein the cement employed to affix the sheet of light-polarizing material to the supporting plate possesses an index of refraction differing from that of the supporting plate; to provide such a structure wherein the light-polarizing material is affixed to a roughened or ground surface of the supporting plate; to provide such a structure wherein the polarizing medium employed comprises a suspension of oriented polarizing particles in a plastic; and to provide such a structure wherein the adhesive employed is a non-solvent for the light-polarizing elements.

Another object of the invention is to provide a structure of the character described wherein the adhesive employed may comprise a plastic, and more specifically a vinyl compound, such for example as highly polymerized vinyl acetate plasticized with a non-solvent of the light-polarizing material employed.

A still further object of the invention is to provide a product of the character described wherein the supporting plate comprises a sheet of glass, and preferably a sheet of ground glass, and wherein the light-polarizing element is adhesively affixed to the ground surface of said sheet of glass.

Other objects of the invention will in part be obvious and will in part appear hereinafter.

The invention accordingly comprises the product possessing the features, properties, and the relation of elements which are exemplified in the following detailed disclosure, and the scope of the application of which will be indicated in the claims.

For a fuller understanding of the invention, reference should be had to the accompanying drawing, which represents a cross-sectional view, greatly enlarged, of a diffusing light-polarizer embodying the invention.

It has been found desirable frequently to provide means for simultaneously polarizing and diffusing a beam of light. For example, in advertising displays, in photoelectric devices, in photography, and in many other fields, it is desirable to furnish a diffused plane-polarized beam. It may be desirable to place the diffusing and polarizing screen closely adjacent the light source, and under these circumstances it is highly desirable that no element be associated with the screen adjacent the polarizing element and on the side thereof farthest from the light source which might, by reason of the heat generated by the source, develop strains which would show photoelastic effects when the polarizing screen was viewed through an analyzer.

The preferred form of the device of the present invention contemplates a diffusing light-polarizer comprising a light-transmitting supporting plate 10 to which a light-polarizing element 12 is permanently affixed, as for example by an adhesive 13. Where the supporting plate has a roughened, or ground, or embossed surface 11, diffusion of the transmitted beam may be effected by employing as a cement a material having a different index of refraction from that of the supporting plate. For example, where glass is employed as the supporting plate with an index of refraction of approximately 1.52, and where the material made and sold as "Polaroid" is employed as the light-polarizing element, a suitable cement may comprise a mixture of a highly polymerized vinyl acetate, such for example as the material sold commercially as "Vinylite A15" and a plasticizer such as dibutyl phthalate. The difference in the index of refraction of the glass supporting plate and the plasticized vinyl compound employed as the cement will be found sufficient to impart adequate diffusion to the beam of light transmitted, the diffusion taking place at the surface formed between the cement and the ground or embossed surface of the glass plate. Inasmuch as the surface between the sheet of light-polarizing material 12 and the cement 13 is relatively smooth, little or no diffusion takes place in the beam thereat, even though the index of refraction of the cement may differ from the index of refraction of the polarizing sheet. Actually where the cement employed comprises 325 grams of the vinyl compound to each 100 c. c. of dibutyl phthalate as a plasticizer, the index of refraction of the resulting mixture closely approximates that of the light-polarizing sheet if the material made and sold under the trade-name "Polaroid" is employed as the polarizer.

This material is preferred, as it is available in sheet-like form and as an excellent bond may be effected between it and a supporting plate of glass by the use of the adhesive described. Polaroid comprises a set suspension of oriented particles of a light-polarizing medium in a suitable transparent suspending medium, such for example as cellulose acetate.

The sheet of light-polarizing material may be affixed to the supporting plate in any satisfactory manner. For example, the mixture of Vinylite A15 and dibutyl phthalate may be thinned by the addition of ethyl acetate and applied to the plate of glass as a paint in a series of coats, each coat being permitted to dry until the solvent has evaporated, and a sufficient number of coats being applied until the adhesive layer is of the desired thickness, which may be approximately .005 inch. The sheet-polarizer may then be lightly but uniformly pressed to the adhesive to eliminate wrinkles, bubbles and the like. The pressure may then be substantially increased, and finally the polarizer and supporting plate may be heated to a temperature of approximately 210° F. under a uniform pressure of approximately 15 pounds per square inch and maintained under those conditions for a period of approximately two hours.

If desired the adhesive may be applied between the polarizer and the glass in the form of a sheet containing no solvent, and the materials may then be uniformly pressed and heated in the manner previously described, or the adhesive may be melted and smoothly applied to the ground face of the supporting plate.

Inasmuch as the diffusion obtained depends largely upon the difference between the index of refraction of the cement employed and that of the supporting plate, it will be apparent that different degrees of diffusion may be obtained by altering the cement or by adding thereto ingredients to change its index of refraction in a manner well known to those skilled in the art. As the index of refraction of the cement more closely approximates the index of refraction of the supporting plate, the diffusion is decreased.

It will furthermore be apparent that the character of the surface of the supporting plate against which the polarizing material is bonded affects the diffusion of the transmitted beam. The supporting plate may be ground or embossed or otherwise treated to provide a roughened surface, and the character of the surface, as well as the difference between the indices of refraction of the plate and the cement employed may determine the degree of diffusion secured. A high degree of diffusion is not ordinarily necessary.

It will be apparent that the supporting plate need not be of ground glass, but may be of opal glass, or embossed glass, or of embossed or ground transparent material, such as "celluloid" or the like.

It will also be apparent that although Polaroid is mentioned as a preferred polarizing element, other polarizers may be employed. Polaroid is preferred because of its availability in large areas, its cheapness and its durability.

If desired the laminated sheet of polarizing material may be coated by a transparent waterproof cement or varnish to protect it.

The device of the present invention has been described as one wherein a smooth sheet of polarizing material is affixed to a roughened supporting plate. It will be apparent that if the supporting plate is smooth along its surface of contact with the cement employed as a bonding material, a diffusing effect may be secured by deliberately roughening, as for example by pitting or indenting, the polarizing sheet employed. This may be accomplished by pressing the polarizing sheet to the glass or other supporting plate by means of a roughened or pitted element, and by effecting the bond between the polarizer and the supporting plate under such conditions that the depressions or irregularties in the surface of this pressing element are incorporated in the polarizing body. Such a treatment would result in the same type of irregularity in the surface between the cement and the polarizer as is shown in the drawing in the surface between the cement and the glass supporting plate, and under such circumstances diffusion of the transmitted beam could be secured by employing a cement having an index of refraction differing substantially from that of the polarizing sheet.

It will furthermore be understood that the use of elliptical, or more specifically circular, polarizers in lieu of plane-polarizers is contemplated, or the use with a sheet-like plane-polarizing element of any suitable fractional wave device adapted to alter the characteristics of the polarized beam.

The operation of the device will be apparent. A beam of light impinging upon the transparent supporting plate traverses that plate with its characteristics substantially unaltered until it impinges upon the roughened surface, which may be either the surface of the supporting plate or the surface of the polarizing element adjacent the bonding cement. As has been pointed out, the cement possesses an index of refraction differing from that of the element providing the roughened surface, and this difference in index, coupled with the irregularities in the roughened surface, results in a diffusion of the transmitted beam. As the beam traverses the polarizing element, the undesired component is removed and a polarized, diffused beam is produced.

It will be apparent that the type of light-transmitting adhesive employed is unimportant so long as it effects an adequate bond and possesses the desired index of refraction.

Since certain modifications in the article which embodies the invention may be made without departing from its scope, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and useful and desire to secure by Letters Patent is:

1. A diffusing light-polarizer comprising, in combination, a light-polarizing element comprising sheet-like means containing light-polarizing particles positioned with their polarizing axes oriented to substantial parallelism, a supporting element and an adhesive bonding said elements to each other, at least one of the elements having a light-diffusing surface in contact with said adhesive, the index of refraction of said adhesive differing from the index of refraction of the element having the light-diffusing surface.

2. A diffusing light-polarizer comprising a sheet-like light-polarizing material comprising a suspension of oriented polarizing particles in a light-transmitting medium and adhesively affixed to a supporting element having a light-diffusing surface by an adhesive having an index of refraction differing from the index of refraction of said supporting element, said adhesive being adapted to bond said material to the diffusing surface of said element.

3. A diffusing light-polarizer comprising a sheet-like light-polarizing material, comprising a suspension of oriented polarizing particles in a light-transmitting medium adhesively affixed to the ground face of a sheet of ground glass by a cement having an index of refraction differing from that of said glass.

4. In combination, a light-transmitting supporting element, a light-polarizing element comprising a suspension of oriented polarizing particles in a light-transmitting medium and an adhesive bonding said elements together, the adhesive comprising a plasticized plastic, at least one of said elements having a surface in contact with the adhesive adapted to diffuse a transmitted beam of light, the adhesive having a different index of refraction from the index of refraction of said element.

5. In combination, a light-transmitting supporting element, a light-polarizing element comprising a suspension of oriented polarizing particles in a light-transmitting medium and an adhesive bonding said elements together, the adhesive comprising a vinyl compound, at least one of said elements having a surface in contact with the adhesive adapted to diffuse a transmitted beam of light, the adhesive having a different index of refraction from the index of refraction of said element.

6. In combination, a light-transmitting supporting element, a light-polarizing element comprising a suspension of oriented polarizing particles in a light-transmitting medium and an adhesive bonding said elements together, the adhesive comprising a vinyl compound plasticized with a non-solvent of cellulose acetate, at least one of said elements having a surface in contact with the adhesive adapted to diffuse a transmitted beam of light, the adhesive having a different index of refraction from the index of refraction of said element.

7. In combination, a light-transmitting supporting element, a light-polarizing element comprising a suspension of oriented polarizing particles in a light-transmitting medium and an adhesive bonding said elements together, the adhesive comprising a vinyl compound plasticized with dibutyl phthalate, at least one of said elements having a surface in contact with the adhesive adapted to diffuse a transmitted beam of light, the adhesive having a different index of refraction from the index of refraction of said element.

8. In combination, a light-transmitting supporting element, a light-polarizing element comprising a suspension of oriented particles of a light-polarizing material in a cellulosic medium, and an adhesive bonding said elements together, the adhesive comprising a vinyl compound plasticized with a non-solvent of said cellulosic medium, at least one of said elements having a surface in contact with the adhesive adapted to diffuse a transmitted beam of light, the adhesive having a different index of refraction from the index of refraction of said element.

9. A diffusing light-polarizer comprising a sheet-like light-polarizing element comprising a suspension of oriented polarizing particles in a light-transmitting medium adhesively affixed on one of its faces to the diffusing surface of a light-transmitting supporting element by a cement having an index of refraction differing from that of said element, the other surface of said light-polarizing element being coated with a waterproofing cement.

EDWIN H. LAND.